J. O'CONNOR.
Wheels for Vehicles.

No. 143,776.  Patented Oct. 21, 1873.

Attest:  
D. Klow  
Harry Coleman

Inventor:  
James O'Connor  
by W. H. Finckel  
his atty.

UNITED STATES PATENT OFFICE.

JAMES O'CONNOR, OF JACKSON, MISSOURI.

IMPROVEMENT IN WHEELS FOR VEHICLES.

Specification forming part of Letters Patent No. 143,776, dated October 21, 1873; application filed July 7, 1873.

*To all whom it may concern:*

Be it known that I, JAMES O'CONNOR, of Jackson, in the county of Cape Girardeau and State of Missouri, have invented certain Improvements in Wheels, of which the following is a specification:

This invention relates to certain improvements in wheel-spokes and their attachment to the hub. These improvements consist of spokes having their lower ends made in a conical concavo-convex form, with straight grooved sides, whereby they can be more securely fastened together, and serve to strengthen and support each other when set in the hub, said hub having an annular groove instead of mortises, in which the spokes are fitted and held by flanges encircling the hub, which are provided with annular ribs that fit in corresponding grooves in the sides of the spokes, said flanges being riveted or bolted together through the spokes.

Figure 1:
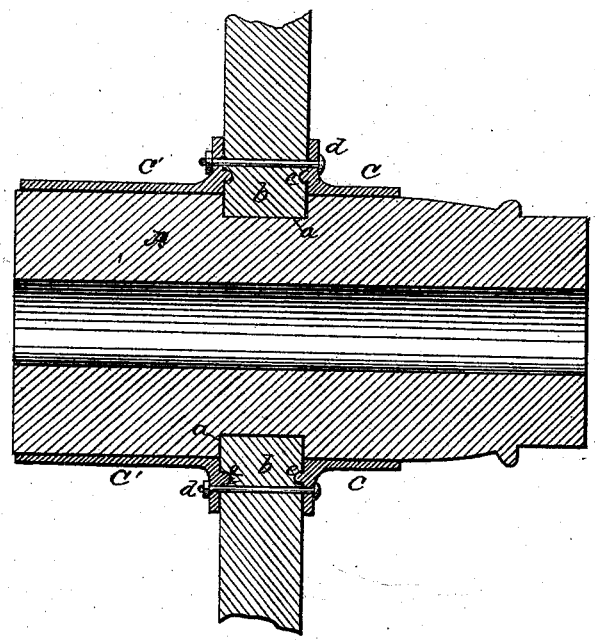
Figures 2, 3, 4:
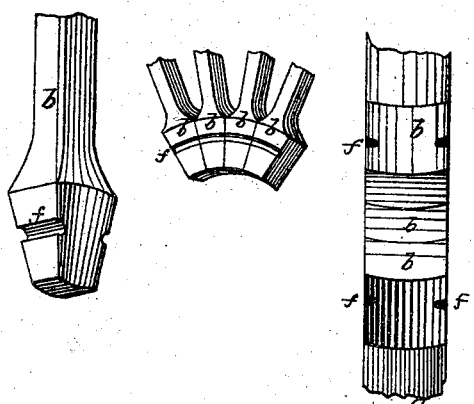

In the drawings, Figure 1 is a central vertical longitudinal section of my hub. Fig. 2 is side view of several spokes, showing the annular groove. Fig. 3 is a perspective view of one of the spokes. Fig. 4 is an end view of the spokes, showing their peculiar form.

The letter A represents a wooden hub of ordinary construction, except that instead of mortises it is made with an annular groove, $a$, in which the ends of the spokes $b$ are fitted. $c$ $c'$ are L-shaped flanges encircling the hub, and arranged in front and rear of the spokes, their vertical portions bearing against the sides of the lower ends thereof. $d$ $d$ are bolts or rivets passing through the flanges and spokes to hold them together and in place in the groove $a$; and in order to render this fastening still more secure, I form annular ribs $e$ on the inner faces of the vertical portions of the flanges, which fit in corresponding grooves $f$ in the sides of the spokes, thereby rigidly holding the spokes in place. The spokes, as shown more particularly in Figs. 2, 3, and 4, have their lower ends made in the shape of inverted cones, with one face concave and the other convex, the sides being straight and provided with grooves $f$. By this construction, they sustain and support each other against lateral strain; are closely and evenly fitted together, and thereby present a solid base for resistance, thus greatly increasing the strength of the wheel. The flange $c'$ may be made of the same size as flange $c$, or may cover the whole of the rear portion of the hub, as desired.

By this combination of elements, I obtain advantages which overcome many difficulties hitherto experienced by wheelwrights, among which are the following: By making a groove in the hub, I do away with the expense and labor of cutting mortises; the hub is not so much weakened, and there is no possibility of the lubricating-oil working into the spokes and loosening their joints; tenons do not have to be made on the lower ends of the spokes, whereby another saving is gained; and, besides, the spokes are stronger, can be more firmly put together, so as to resist lateral strain, while the flanges serve to hold them firmly and securely in the annular hub-groove.

Having thus described my invention, what I claim as new, and desire to secure by Letters Patent, is—

A wheel provided with spokes $b$, having their lower ends made in a conical concavo-convex form, with straight grooved sides, in combination with the hub A, constructed with an annular groove, $a$, in which the spokes are fitted, and the flanges $c$ $c'$, having ribs $e$, which extend into the grooves $f$ in the spokes, substantially as and for the purpose shown and described.

To the above specification of my invention I have signed my name this 20th day of May, A. D. 1873.

JAMES O'CONNOR.

Witnesses:
 W. W. CRAMER,
 N. C. HARRISON.